United States Patent [19]

Haas

[11] Patent Number: 5,598,534
[45] Date of Patent: Jan. 28, 1997

[54] SIMULTANEOUS VERIFY LOCAL DATABASE AND USING WIRELESS COMMUNICATION TO VERIFY REMOTE DATABASE

[75] Inventor: Zygmunt Haas, Holmdel, N.J.

[73] Assignee: Lucent Technologies Inc., Murray Hill, N.J.

[21] Appl. No.: 309,711

[22] Filed: Sep. 21, 1994

[51] Int. Cl.⁶ .................................................. G06F 15/00
[52] U.S. Cl. .................................. 395/200.09; 395/827
[58] Field of Search ........................ 364/424.03, 424.04, 364/551.01, 138; 340/870.16, 870.03; 371/19, 69.1; 395/575

[56] References Cited

U.S. PATENT DOCUMENTS

| | | | |
|---|---|---|---|
| 4,696,003 | 9/1987 | Kerr et al. .......................... | 371/19 |
| 5,115,432 | 5/1992 | Haas ................................. | 370/94.1 |
| 5,157,610 | 10/1992 | Asano et al. ..................... | 364/424.03 |
| 5,243,607 | 9/1993 | Masson et al. ................... | 371/69.1 |
| 5,335,342 | 8/1994 | Pope et al. ....................... | 395/575 |

Primary Examiner—Thomas C. Lee
Assistant Examiner—Terance J. Stanton

[57] ABSTRACT

A process for efficiently distributing processing between a mobile computing device having limited resources and at least one remote computing device having substantially greater resources than the mobile computing device, comprises establishing wireless communication between the mobile computing device and the remote computing device in response to a user's invoking of an application at the mobile device. The mobile computing device executes, in parallel, a first version of an algorithm for performing a function associated with the user-invoked application to obtain a first result, and the remote computing device executes a second version of an algorithm for performing the same function associated with the user-invoked application to obtain a second result. The results that are available first (generally the locally generated results) are presented to the invoked application on the mobile device. The application is thereafter updated with the most reliable results, which are determined by comparing the remotely-generated result with those locally generated at the mobile computing device and evaluating any difference therebetween.

11 Claims, 4 Drawing Sheets

SIMULTANEOUS VERIFY LOCAL DATABASE AND USING WIRELESS COMMUNICATION TO VERIFY REMOTE DATABASE

FIELD OF THE INVENTION

The present invention relates generally to mobile computing devices and, more particularly, to an apparatus and method for distributing processing between a remote mobile computing device and a backbone network, so as to optimally deliver and utilize personal communication services.

BACKGROUND OF THE INVENTION

Interest in mobile computing, a relatively new field, has been largely driven by the miniaturization of electronics and by the focus in technical literature on wireless communications and personal communication services (PCS). As mobile computing machines continue to shrink in size, it has become evident that a practical implementation of "data-oriented" PCS will require a delicate balance between the competing objectives of reduced size and acceptable system performance. Examples of currently available mobile computing devices include modem-equipped notebook computers and personal digital assistants (PDAs)

PCMCIA (Personal Computer Memory Card International Association) cards advantageously provide the notebook computer or PDA user with an opportunity to enhance or to expand the unit's basic capabilities where space is at a premium. Although PCMCIA cards may be utilized for such diverse applications as modems, exterior storage devices, sound cards, and printers, they are particularly well suited for wireless communications applications in which a communications link must be established between the mobile computer and a remote processing device or network of such processing devices.

Reductions in the size of portable or mobile computing machines have come at the expense of certain resource limitations which, in turn, substantially limit system performance. One obvious example of a resource constraint which directly impacts the operating performance of mobile computers is battery size. Smaller machines carry smaller batteries. To support "uninterrupted" operation for 4–6 hours, a typical performance benchmark, power consumption is minimized by setting the clock speed below a given rate. Other performance-affecting resource limitations of mobile computing machines relate to memory size, CPU cycles, wireless transmission bandwidth, display size, and the like. In some cases, there is a dependency between the limitations. For example, smaller battery capacity may necessitate less wireless bandwidth.

SUMMARY OF THE INVENTION

The present invention avoids the disadvantages and limitations associated with conventional mobile computing devices by utilizing a progressive execution technique (PET) that optimally distributes the processing load between the mobile computer and a remotely accessible backbone network in a wireless communications environment.

In accordance with one aspect of the present invention, processing is distributed between a mobile computing device having limited resources and at least one remote computing device having substantially more resources than the mobile computing device. Connectivity between the mobile computing device and the remote computing devices may, for example, be achieved either by way of a wireless local-area network or through a wide-area wireless network.

Optimal distribution of processing in accordance with the present invention is functionally dependent upon several considerations which include, but are not limited to, power consumption (i.e. battery life) and wireless bandwidth usage (e.g. the cost of communication in a cellular environment). A process for efficiently distributing processing between the mobile computing device and the remote computing device(s) comprises establishing wireless communication between the mobile computing device and the remote computing device when the user invokes an application. The mobile computing device executes a first version of an algorithm for performing a function associated with the user-invoked application to obtain a first result, and the remote computing device executes, in parallel, a second version of an algorithm for performing the function associated with the user-invoked application to obtain a second result. The results available first, generally the locally-generated results, are initially passed to the local user or to an application. The results are then updated with the most reliable results, which may generally be those determined by or in conjunction with the remote device.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

Figure 3:
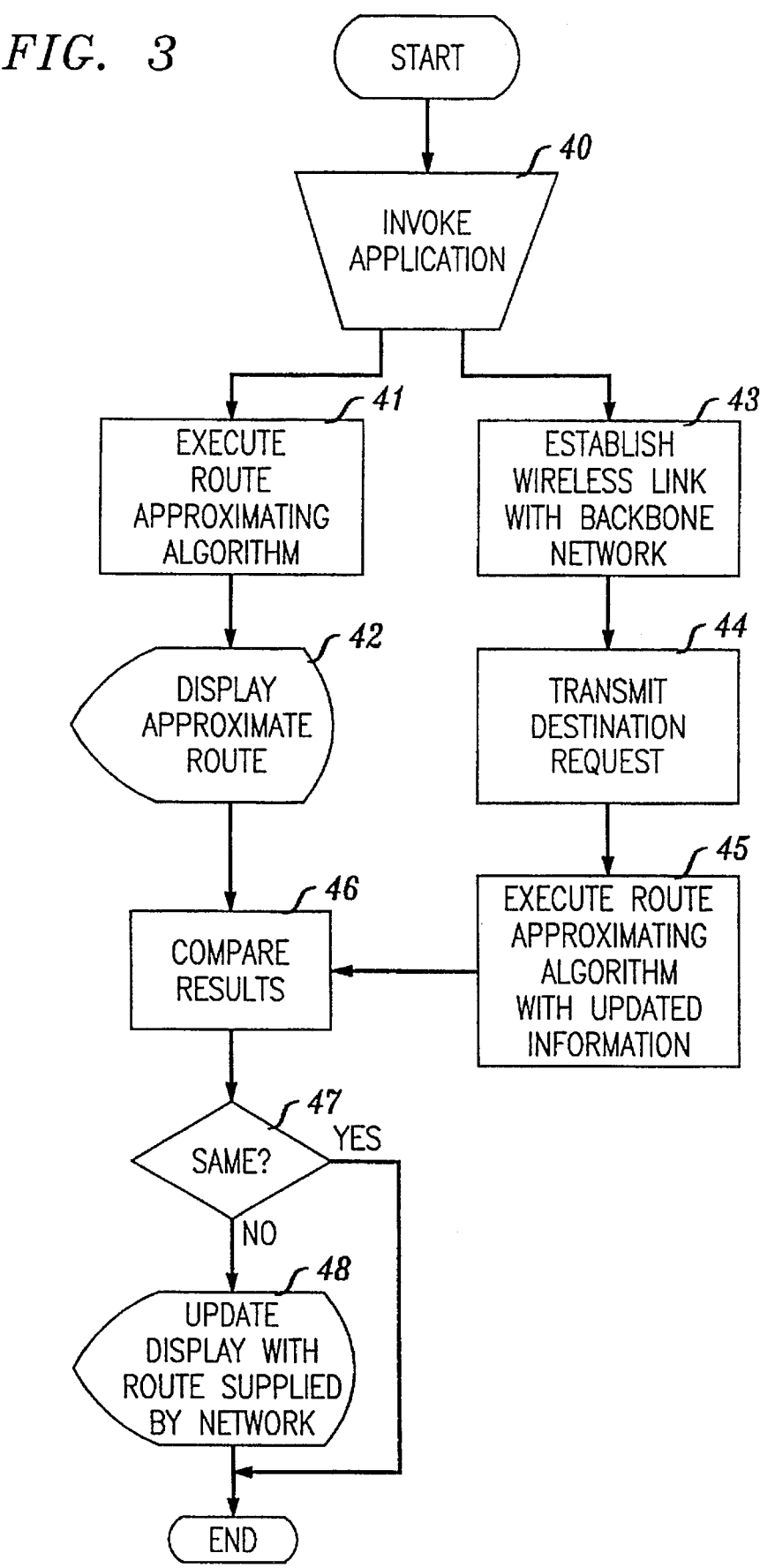
Figure 4:
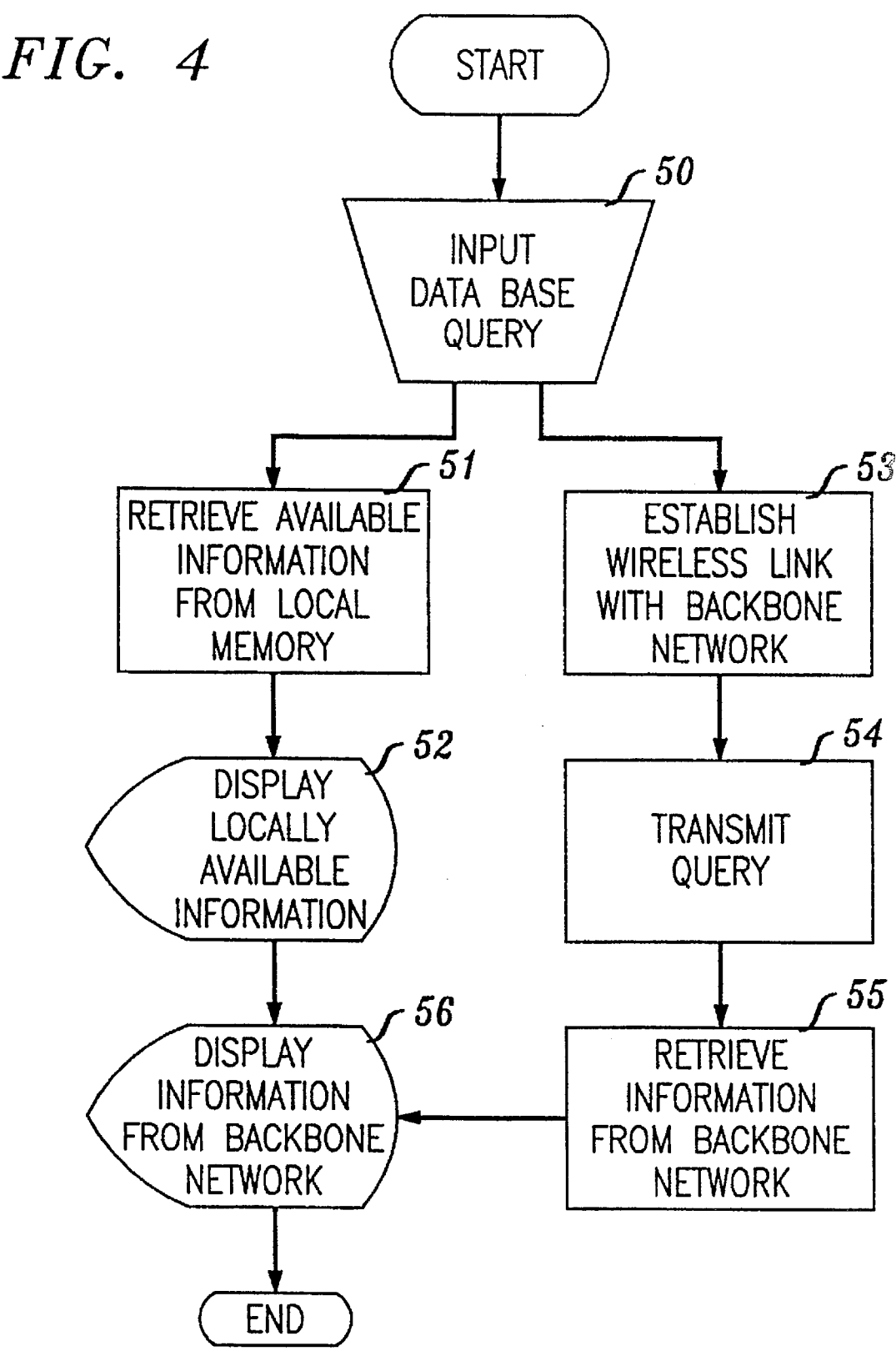

FIG. 3 is a flow chart depicting the distribution of processing between a mobile computer and a backbone network in a further illustrative application employing the teachings of the present invention; and FIG. 4 is a flow chart depicting the distribution of processing between a mobile computer and a backbone network in yet another illustrative application employing the teachings of the present invention.

DETAILED DESCRIPTION OF THE PRESENTLY PREFERRED EMBODIMENTS

Figure 1:
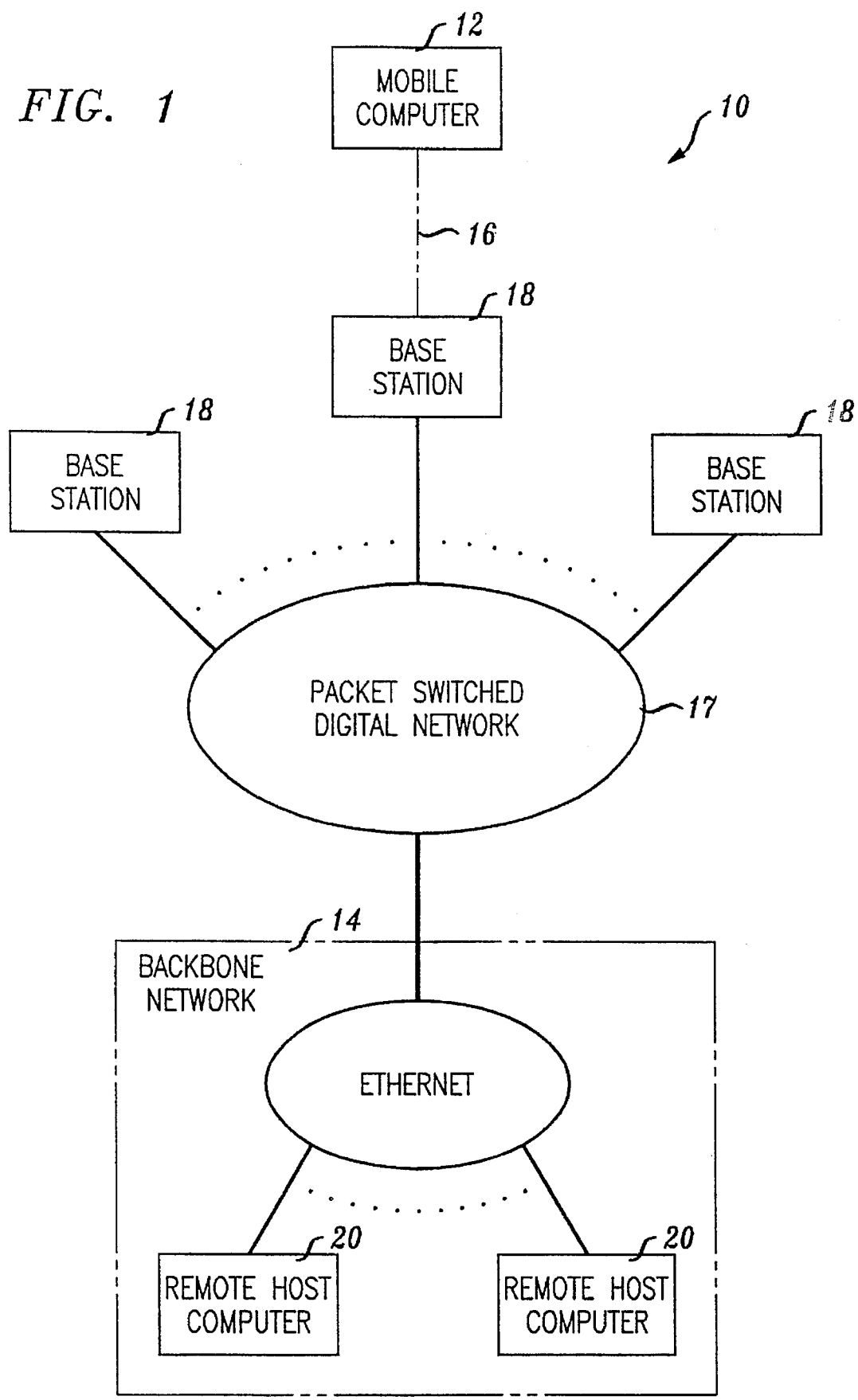
FIG. 1 is a block diagram depicting an illustrative system in which the processing distribution technique of the present invention may be employed.

With reference to FIG. 1, there is shown an illustrative system 10 in which processing responsibilities are distributed between a mobile computing device 12 and one or more host computing devices of a backbone network 14 in accordance with the present invention. Initially, it should be noted that as utilized herein, the term "mobile computing device" is intended to encompass any portable devices having on-board data processing and information display capabilities such, for example, as notebook computers and personal digital assistants (PDAs) and the like.

In the illustrative system depicted in FIG. 1, the mobile computing device 12 is a PDA. PDA devices are commercially available and may include a pressure sensitive display for enabling the user to launch applications and input information, via a stylus or similar user-controlled hand-held and manipulated device, within a graphical user interface environment or the like. PDA device 12 may also include a conventional Type II PCMCIA slot for receiving a wireless communications interface card (not shown) configured to establish a wireless communication link 16 with backbone network 14 when an application requiring such a link is launched by the user. Power for the PDA is generally provided by several small batteries such, for example, as standard AA size batteries. As indicated above, power consumption may be minimized by limiting the clock speed and number of CPU cycles per unit time.

With continued reference to FIG. 1, it will be seen that a communication path between the mobile computer 12 and fixed backbone network 14 is illustratively achieved via a wide-area wireless network utilizing a packet switched digital network (PSDN) 17 and a plurality of base stations 18. Via link 16, mobile computer 12 operatively communicates directly with one of the base stations. Although a direct communication link 16 is shown between mobile computer 12 and backbone network 14, it will be appreciated by those skilled in the art that communication between the mobile computer and host may also be achieved via an indirect link. Thus, for example, a plurality of mobile computers may be linked together in a wireless local area network arrangement (e.g. Wavelan, Rangelan, Photonics, or the like) in which one mobile computer links another with the remote host. In any event, backbone network 14 may include a single remote host computer or a plurality of such computers, depending, for example, upon the processing resources required for a particular application and the need to access information stored in different locations.

In the illustrative system depicted in FIG. 1, backbone network 14 comprises a plurality of remote host computers 20. The manner in which processing operations are distributed between mobile computer 12 and backbone network 14 in accordance with the present invention will depend upon the relative importance of such parameters as response latency, energy expenditure (i.e. battery life), and the cost of communication (i.e. the amount of wireless bandwidth required). For an important computation, for example, a user may be willing to accept a high cost of communication but not a substantial shortening of the available battery life. Additional parameters that may be considered for achieving optimal distribution of processing include the availability of a wireless connection as well as the then-current load on the backbone network.

Although the processing power of the backbone network 14 may be utilized by mobile computer 12 in accordance with a predetermined scheme that remains fixed, it will be readily ascertained by those skilled in the art that the relevant importance of the above-noted parameters may be dynamically varied on-the-fly with respect to time as well as to the particular application. Accordingly, the distribution of processing operations between the mobile computer and backbone network may, for example, be optimized for each transmission, at predetermined intervals, or for every individual session.

Consider an illustrative situation in which the processing latency of the mobile computer 12 is to be minimized and the accuracy of the displayed results are to be maximized, while local energy expenditure and cost of processing are secondary issues of lesser importance. In accordance with the progressive execution technique of the present invention, the invoked application is processed in parallel by at least two devices—the mobile computer 12 and at least one remote host computer 20. The results are then combined, either by the mobile computer 12 or by the host computer 20, for maximum accuracy.

Figure 2:
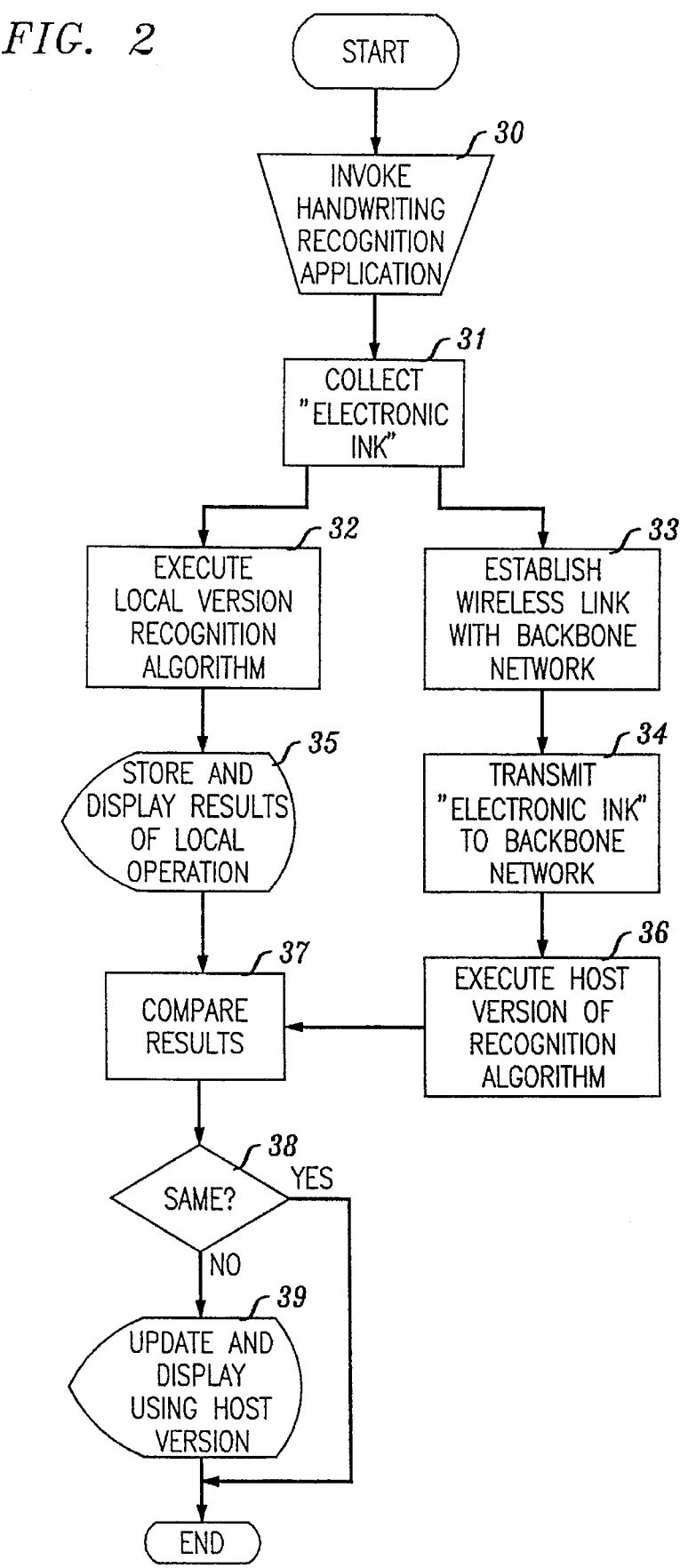
FIG. 2 is a flow chart depicting the distribution of processing between a mobile computer and a backbone network in an illustrative application employing the teachings of the present invention.

With reference now to FIG. 2, a technique for performing handwriting recognition utilizing progressive execution in accordance with the present invention will now be described. As discussed above, the local computer device 12 may comprise a PDA having a pressure sensitive overlay for converting the movements of a stylus into "electronic ink" representative of handwritten information. The techniques for receiving, storing and analyzing information input in this manner are deemed to be well known to those skilled in the art and are not considered a novel aspect of the present invention. Accordingly, a detailed discussion of these techniques is believed to be unnecessary and has been omitted. It suffices to say that, at this time, the state of the art in handwriting recognition performed by mobile computing devices such as PDAs is generally poor, mainly because of the limited processing power and memory possessed by these devices. Thus, although more accurate algorithms are available, they cannot be executed by the mobile computer due to the relatively large amounts of processing power and memory required. In accordance with the present invention, however, sophisticated known algorithms may be exploited by the mobile computer user by utilizing the processing capabilities of the backbone network.

Thus, the user of mobile computer 12 enters handwritten text via a stylus over the unit's pressure sensitive overlay/display, as discussed above. As indicated in block 30 of FIG. 2, the handwriting recognition application is invoked by the user via, for example, a graphical user interface at the time that the information is to be stored in memory. The "electronic ink" is collected in a conventional manner as shown in block 31, and the mobile computer executes a local version of a handwriting analysis algorithm (block 32). A wireless communication link is established between the mobile computer and the remote host, as indicated in block 33, and the collected electronic ink is transmitted to a handwriting recognition server residing on the backbone network or host computer (block 34). A more sophisticated algorithm, which takes full advantage of the enhanced processing capabilities of the backbone network, is executed (block 36) in parallel (i.e. substantially concurrently with the local algorithm).

In general, the results from the local recognition process are available first and are accordingly generated and displayed immediately (block 35). After the local recognition is displayed, presumably or perhaps with some errors, the user may choose between editing the displayed text or waiting for the backbone to respond. Editing, especially with a stylus, is a cumbersome and relatively slow process. Assuming that the user chooses to wait for potentially more reliable results from the more-capable algorithm, the recognition results from the backbone server are transmitted when available and are compared (block 37)—either by the mobile computer or the remote host—with the local recognition results. If the results are the same, no further action need be taken. If however, the results are different and the level of confidence of the backbone results is higher than that of the local results, then the displayed local results are updated with the backbone results (block 39). As will be readily appreciated by those skilled in the art, the additional costs in the above-described example lie in the energy expenditures and use of wireless bandwidth, as well as the use of the processing power of the remote host.

FIG. 3 depicts another example in which the progressive execution technique of the present invention may be employed to enhance the performance capabilities of a mobile computing device. Specifically, the remote backbone network may be configured to advantageously execute an algorithm that utilizes information not locally available to the mobile computer. In the example of FIG. 3, a user travelling by car invokes a shortest route-finding application and enters information relating to present location and desired destination (block 40). The mobile computer, despite its diminutive data storage and processing power resources, executes a limited route-finding algorithm utilizing stored information that is not likely to change with time, such as map distances and driving speed limits, and driving condition information supplied by the user (i.e. snow, rain, night driving, and the like) as shown in block 41. The route recommended by the mobile computer is displayed (block 42). If wireless services are available, a wireless communication link is established between the mobile computer and the remote host, as shown in block 43, and the route request is transmitted to a route estimation server residing on the backbone network or host computer (block 44). A more sophisticated algorithm, which is configured to utilize up-to-date information such as reported road congestion, traffic hazards, road construction, and new routes not yet on the map, is executed by the backbone network (block 45).

The route recommended by the algorithm executed by the backbone network is then compared to the one recommended by the algorithm executed by the mobile computer (block 46), and the shortest or fastest route of the two is displayed (blocks 47 and 48). Alternatively, both may be displayed so that the user may make an informed choice based upon other criteria, such as points of interest along each route. In any event, it should be readily apparent to those skilled in the art that the accuracy of the solution is improved by the use of a backbone network which provides access to up-to-date information not locally available to the mobile computer. Of course, if connectivity to the backbone network is unavailable, the user may still rely on the locally-calculated route.

FIG. 4 depicts yet another example in which the progressive execution technique of the present invention may be employed to enhance the performance capabilities of a mobile computing device. As indicated previously, the remote backbone network may be configured to advantageously exploit information not locally available to the mobile computer. The illustrative example of FIG. 4 depicts a database querying process utilizing a personal database that is too large for storage by the mobile computer. In accordance with this further example, the mobile computer maintains a somewhat less comprehensive database containing limited entries, such as a listing of frequently-called names and selected information associated with each.

The mobile computer user inputs a database query (block 50)—illustratively a request for the facsimile and voice phone numbers of a particular person or business entity. The mobile computer processes the database query and retrieves whatever information it has stored relevant to the subject of the query, as for example the voice phone number (block 51). The retrieved information is then displayed to the user by the mobile computer (block 52). If connectivity to the backbone network is not available, the user may use the locally available information to contact the subject and request the information not supplied by the mobile computer (i.e., the facsimile number). If, however, wireless services are available, a wireless communication link is established between the mobile computer and the remote host, as shown in block 53, and the database query is transmitted to a database server residing on the backbone network or host computer (block 54). The requested information is retrieved by the database server, as shown in block 55, and transmitted to the mobile computer for display thereby (block 56).

In view of the foregoing examples, it will be readily apparent to those skilled in the art that the quality of service provided by a mobile computing device is greatly improved by the progressive execution technique of the present invention when access to a backbone network or other remote computing or support device is available. Even when backbone connectivity is unavailable, the user retains access to the same applications though provided at a lower level of quality (e.g., reliability).

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A process for efficiently distributing processing between a mobile computing device having limited resources and at least one remote computing device having substantially more resources than said mobile computing device, in response to a user invoking an application at the mobile computing device, comprising the steps of:

establishing wireless communication for transferring information between the mobile computing device and the at least one remote computing device;

executing with the mobile computing device a first version of an algorithm for performing a function associated with the user-invoked application to obtain a first result;

executing at the at least one remote computing device, substantially concurrently with said executing at the mobile computing device, a second version of an algorithm for performing the function associated with the user-invoked application to obtain a second result;

supplying to the invoked application on the mobile computing device at least one of the first result and the second result.

2. The process of claim 1, wherein the mobile computing device comprises a portable digital assistant.

3. The process of claim 1, wherein the at least one remote computing device comprises a network of computing devices.

4. The process of claim 1, wherein the first result and said second result are supplied to said invoked application, said first result being supplied thereto prior to said second result.

5. The process of claim 1, wherein said second result is supplied to said application when the second version of the algorithm executed by the at least one remote computing device utilizes in its execution information not available to the mobile computing device.

6. The process of claim 1, further including a step of comparing the first result to the second result, and wherein said supplying step comprises supplying at least one of the first and second results in accordance with an outcome of said comparison.

7. The process of claim 6, wherein said comparing step is performed after supplying said first result.

8. An apparatus for providing personal communication services to a user, comprising:

mobile computer means for executing a first version of an algorithm for performing a function associated with an application invoked by the user;

remote computer means for executing a second version of an algorithm for performing the function associated with an application invoked by the user;

means for establishing a wireless communication link between said mobile computer means and said remote computer means; and interface means for causing said first and second algorithms to be executed in parallel by said mobile computer means and remote computer means, respectively, in response to invoking of the application by the user.

9. The apparatus of claim 8, wherein said mobile computer means includes a visible display.

10. The process of claim 5, wherein the substantially more resources available in the remote computing device than in the mobile computing device comprises said information.

11. The apparatus of claim 8, wherein said interface means further comprises means for supplying to the invoked application on the mobile computing device at least one of the first result and the second result.

* * * * *